Nov. 4, 1969 — J. BOYD — 3,476,447

SELF-ALIGNING HYDROSTATIC BEARING

Filed March 28, 1962

WITNESSES:
Leon M. Garman
James F. Young

INVENTOR
John Boyd
BY Zygmund L. Henny
ATTORNEY

United States Patent Office 3,476,447
Patented Nov. 4, 1969

3,476,447
SELF-ALIGNING HYDROSTATIC BEARING
John Boyd, Pittsburgh, Pa., assignor to Westinghouse Electric Corporation, Pittsburgh, Pa., a corporation of Pennsylvania
Filed Mar. 28, 1968, Ser. No. 716,804
Int. Cl. F16c 29/02, 7/04, 23/00
U.S. Cl. 308—9        10 Claims

ABSTRACT OF THE DISCLOSURE

A bearing sleeve which surrounds a shaft has a cylindrical outer surface and is mounted in a relatively stationary housing having an internal bore curved in a manner to permit the bearing sleeve to tilt or roll axially to accept angular shaft misalignment, thereby making the bearing self-aligning. A lubricating fluid is supplied from an external source of pressure to pockets in the inner surface of the bearing sleeve. The fluid enters the pockets through restricted passages in the bearing sleeve or housing which communicate with a recess or manifold in the housing connected to a supply line.

BACKGROUND OF THE INVENTION

This invention relates, generally, to bearings and, more particularly, to self-aligning hydrostatic bearings.

The operation of a hydrostatic bearing depends on the lubricating fluid being supplied from an external source of pressure to pockets within the bearing. Heretofore, such bearings usually have not been made self-aligning because of the added complication of so constructing a bearing that the lubricant supply passages and/or piping are capable of accommodating the bearing movement. Prior self-aligning hydrostatic bearings are complicated and require flexible supply lines.

It is desirable to provide self-aligning bearings since the allowable unit bearing load (load divided by diameter×length) must be lower on bearings which are unable to align themselves. Therefore, they require larger diameter and/or length to support a given load than bearings which are self-aligning.

An object of this invention is to provide a self-aligning hydrostatic bearing assembly which is simple in construction and efficient in operation, thereby making it possible to reduce size and lubricant flow.

Other objects of the invention will be explained fully hereinafter or will be apparent to those skilled in the art.

SUMMARY OF THE INVENTION

In accordance with one embodiment of the invention, a relatively stationary bearing housing encloses a bearing sleeve which surrounds a rotatable shaft. The bearing sleeve has a cylindrical outer surface coacting with the internal bore of the housing which is curved in a manner to permit the bearing sleeve to tilt or roll axially to accept angular shaft misalignment. Spaced pockets are provided in the inner surface of the bearing sleeve. A lubricating fluid from an external source of pressure is supplied to the pockets through restricted passages in the bearing sleeve which communicate with a recess or manifold in the bearing housing connected to a supply line.

BRIEF DESCRIPTION OF THE DRAWINGS

For a better understanding of the nature and objects of the invention, reference may be had to the following detailed description, taken in conjunction with the accompanying drawing in which.

DESCRIPTION OF PREFERRED EMBODIMENT

Figure 1:
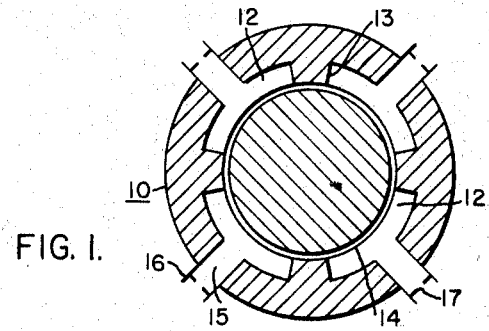
FIGURE 1 is a sectional view, showing the principle of operation of a hydrostatic bearing.

The principle of operation of a hydrostatic bearing is illustrated in FIG. 1 in which a generally cylindrical bearing sleeve 10 surrounds a vertical shaft 11. A plurality of equally spaced pockets 12 are provided in the inner surface of the sleeve between axially extending radial projections 13 on the inner surface. The projections extend between an inwardly extending flange 14 at the lower end of the sleeve and a similar flange (not shown) at the upper end of the sleeve. A passageway 15 extends from each pocket 12 to the outer surface of the sleeve 10. The passageways are connected by lines or pipes 16 to a common source of lubricant under pressure. A restriction 17 is provided in each supply line to provide compensating or restoring action of the bearing. Thus, when the pockets are filled with the lubricating fluid under pressure, the rotating shaft is supported in the bearing by the fluid.

Figures 2, 3:
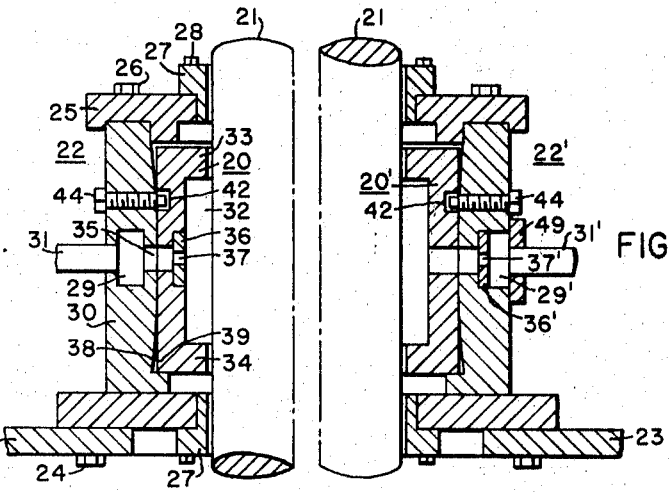
FIG. 2 is a view, partly in vertical section and partly in elevation, of a portion of a self-aligning hydrostatic bearing assembly embodying principal features of the invention.
FIG. 3 is a view, similar to FIG. 2, of a modified bearing assembly.

In the portion of the self-aligning hydrostatic bearing assembly shown in FIG. 2, a generally cylindrical bearing sleeve 22 surrounds a rotatable shaft 21. The sleeve 20 is enclosed by a bearing housing 22. The other half of the bearing assembly is symmetrical with the portion shown. The housing 22 is retained in a relatively stationary position by a supporting member 23 to which the housing is attached by bolts 24. The upper end of the housing is covered by a ring 25 attached to the housing by bolts 26. For non-submerged applications, shaft seals 27, which may be of any suitable type, are disposed between the shaft and the housing. The seals may be retained in position by bolts 28. For submerged applications, seals are not required. Manifold means 29 is provided in the wall 30 of the housing 22. The manifold means is connected to a fluid pressure source (not shown) by a pipe or line 31 joined to the wall 30, as by threads. When shaft seals are utilized, a return line may be provided from the seal to the fluid pressure source.

Spaced pockets 32, similar to the pockets 12 in FIG. 1, are provided in the inner surface of the sleeve 20. The pockets 32 are disposed between axially extending radial projections (not shown), similar to projections 13 in FIG. 1, and inwardly extending flanges 33 and 34 on the sleeve 20. A passageway 35 connects each pocket 32 with the manifold means 29 which may extend around the housing 22 or may be sub-divided, with each division serving one or more pockets. An orifice 37 is provided in the sleeve 20 at each passageway 35 to restrict the flow of fluid, thereby providing the compensating or restoring action of the bearing in a manner well known in the art. The orifice 37 may be in a washer 36 secured in the sleeve 20.

In order that the bearing will be self-aligning, the housing 22 has a hyperbolic, or equivalent, curved internal bore 38 which coacts with the cylindrical outer surface 39 of the bearing sleeve 20 to permit the sleeve to tilt or roll axially to accept angular shaft misalignment. The amount of curvature for the bore 38 shown in the drawing is exaggerated. Since the passageway 35 for each pocket 32 is at the crown of the hyperbola, only a small amount of fluid leakage occurs at the joint between the passageway 35 and the manifold means 29. The radius of curvature is large enough that the leakage would be small even if the passageway were not at the crown of the hyperbola. The location at the crown minimizes leakage. Thus, fluid pressure can be maintained in the pockets 32 to support the rotating shaft 21.

In order to limit rotation of the sleeve 20, a projecting pin 44 is fixed, as by threading, in the wall 30 of the housing 22 and extends into a recess 42 in the sleeve 20. Sufficient clearance is provided in the recess 42 for the pin 44 to permit self-aligning movement of the sleeve 20 in the manner hereinbefore described.

Figure 4:
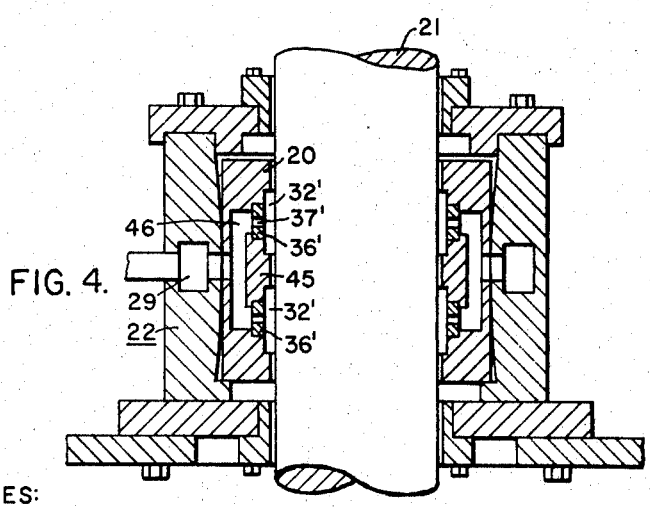
FIG. 4 is a view, partly in vertical section and partly in elevation of another modification of the invention.

In the bearing assembly shown in FIG. 2, the forces necessary to realign the bearing are provided by contact between the shaft 21 and the end lands or flanges 33 and 34 on the bearing sleeve 20. In the modified assembly shown in FIG. 4, pockets 32' are arranged in pairs with the two pockets in each pair being spaced axially along the shaft 21. The pockets 32' are separated by a central partition 45 in the sleeve 20'. A passageway 46 common to the two pockets 32' of each pair of pockets is provided in the sleeve 20'. A flow restrictor 36' having an orifice 37' is provided in the sleeve 20' at the entrance to each pocket 32'. With an array of pockets at either end of the bearing, as shown in FIG. 4, realignment of the bearing will be provided by purely hydrostatic forces without the necessity of contact between the shaft and the bearing sleeve.

The modified bearing assembly shown in FIG. 3 is similar to the assembly illustrated in FIG. 2 except that the flow restrictors 36' are located in the housing 22' instead of in the sleeve 20'. Also, the pipe 31' is joined to a plate 49 secured to the housing 22' over the manifold means 29' in the housing 22'. The assembly shown in FIG. 3 functions in the manner of the assembly shown in FIG. 2.

The bearing sleeve 20 may be inserted into the housing 22 without requiring a split housing. It is reattained in the housing by the ring 25. The bearing assembly can be installed on the shaft 21 without the necessity of splitting the housing.

From the foregoing description, it is apparent that the invention provides a self-aligning bearing assembly which allows the bearing to align freely, since it is based on a rolling contact and does not involve sliding. The present assembly does not involve flexible pressure supply lines or require special piping or lubricant passages. The bearing can be applied without appreciably increasing bearing wall thickness over that required for non-self-aligning bearings. The bearing is of a simple construction which facilitates manufacture and maintenance.

Since numerous changes may be made in the above-described construction and different embodiments of the invention may be made without departing from the spirit and scope thereof, it is intended that all subject matter contained in the foregoing description or shown in the accompanying drawing shall be interpreted as illustrative and not in a limiting sense.

I claim as my invention:

1. In a self-aligning hydrostatic bearing assembly for use with a rotating shaft, a generally cylindrical bearing sleeve for surrounding the shaft, said sleeve having a cylindrical outer surface, a bearing housing enclosing the bearing sleeve, said housing having a curved internal bore coacting with said outer surface to permit the sleeve to tilt axially to accept angular shaft misalignment, the inner surface of the sleeve having a plurality of pockets therein, manifold means in said housing communicating with said pockets, and means for connecting said manifold means to a fluid pressure source.

2. The combination defined in claim 1, including means for retaining said bearing housing in a relatively stationary position.

3. The combination defined in claim 1, wherein the bearing sleeve has passageways therein connecting the pockets with the manifold means in the housing.

4. The combination defined in claim 3, including means restricting the flow of fluid in said passageways.

5. The combination defined in claim 3, including means in the housing restricting the flow of fluid in said passageways.

6. The combination defined in claim 3, including means in the bearing sleeve restricting the flow of fluid in said passageways.

7. The combination defined in claim 3, wherein the housing bore is hyperbolic, and the passageways in the bearing sleeve are at the crown of the hyperbola.

8. The combination defined in claim 1, including projecting means in the housing for limiting movement of the bearing sleeve.

9. The combination defined in claim 1, wherein the pockets in the sleeve are arranged in pairs with the two pockets in each pair spaced axially along the shaft.

10. The combination defined in claim 9, including a common passageway in the sleeve for each pair of pockets.

References Cited

UNITED STATES PATENTS 3,360,309   12/1967   Voorhies _____ 308—72

MARTIN P. SCHWADRON, Primary Examiner

F. SUSKO, Assistant Examiner

U.S. Cl. X.R.

308—72